Dec. 26, 1939.　　　F. W. JOBE　　　2,184,507

APPARATUS FOR TESTING VISION

Filed July 2, 1937

FREDERICK W. JOBE
INVENTOR.

BY

ATTORNEYS

Patented Dec. 26, 1939

2,184,507

UNITED STATES PATENT OFFICE 2,184,507

APPARATUS FOR TESTING VISION

Frederick W. Jobe, Rochester, N. Y., assignor to Bausch & Lomb Optical Company, Rochester, N. Y., a corporation of New York Application July 2, 1937, Serial No. 151,680

1 Claim. (Cl. 88—20)

The present invention relates to a method and apparatus for testing vision.

One of the objects of the present invention is to provide apparatus for testing vision in which the minimum discernible contrast between a test object and its background is used as the measure of visual acuity. Another object is to provide apparatus for testing vision in which the size and contrast of the test object is measured. A further object is to provide apparatus for testing vision in which an image of a test object is projected on a screen, a veiling glare projected on said image and the relative intensities of the image and glare used as a measure of visual acuity. These and other objects and advantages reside in certain novel features of construction, arrangement and combination of parts and processes as will hereinafter be more fully set forth and pointed out in the appended claim.

Referring to the drawing.

In the testing of visual acuity, it is well known that the size of the test characters is not the only condition to be taken into consideration. The illumination of the test characters and the contrast between the test characters and the background at the threshold of vision are equally significant. The independent and exact control of the size, illumination and contrast of the test characters provides an extremely sensitive and exact means of determination of the visual acuity.

Figure 1:
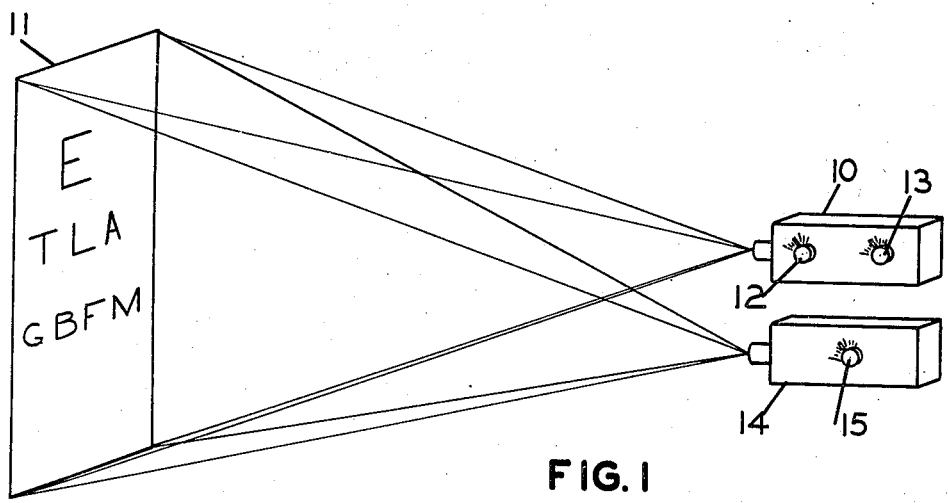
Fig. 1 is a diagrammatic view illustrating my invention.

Fig. 1 shows a diagrammatic sketch of an apparatus for practicing the present invention. A projector 10 forms an image of a test object, such as the test letters shown, upon the screen 11. This projector 10 is provided with suitable means for varying the size of the image of the test object. One suitable projector is that shown in U. S. Patent No. 1,174,547 issued March 7, 1916, to M. B. Clason. The projector 10 is also provided with an adjustable diaphragm or the like for controlling the intensity of the image beam. Suitably calibrated dials 12 and 13 on the projector 10 indicate, respectively, the size of the test characters and the intensity of the beam. The actual structures of these controls and indicators are well known in the art and since the structures themselves form no part of the present invention, they are shown only diagrammatically.

A light projector 14 is located adjacent the projector 10 and serves to project a veiling glare on the same area of the screen as that occupied by the image. The intensity of the beam from the projector 14 can also be controlled, as, for example, by means of an iris diaphragm, and the intensity of the beam is indicated on a suitable dial 15. By changing the intensity the beam from the projector 14, the contrast between the test characters and the background can be varied.

Figure 2:
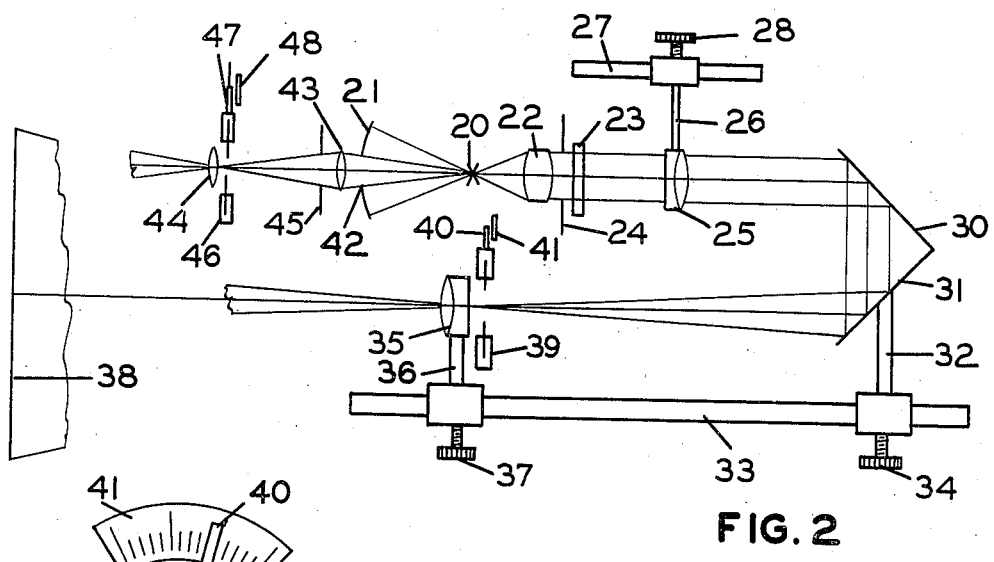
Fig. 2 is a diagrammatic view illustrating a suitable form of projection system.
Figure 3:
Fig. 3 is a front view of a suitable diaphragm.

One compact unitary device for performing the present test is illustrated in Fig. 2. A light source 20 having a reflector 21 directs light through a condenser 22 onto a transparent test object 23. A suitable diaphragm 24 is provided to define the size and shape of the light beam. A lens 25 is secured on a mount 26 which is suitably adjustable, as for example, on a support 27, and can be locked in position by a set screw 28. Two reflectors 30 and 31 are secured together in the path of the light beam and direct the light back parallel to itself. These reflectors 30 and 31 are fixed on a mount 32 which is adjustably carried by a support 33. A set screw 34 locks the reflector mount 32 relative to the support 33.

A second lens 35, fixed on a mount 36 which may also be adjustable on the support 33 and locked by a set screw 37, acts with the lens 25 to form an objective for imaging the test object 23 on the screen 38. The size of the images of the test characters on the screen 38 may be varied by moving the reflector mount 32 and by changing the optical distance between the lenses 25 and 35.

An adjustable diaphragm 39 which may be of the conventional iris type, is located adjacent the lens 35. This diaphragm 39 is controlled by a handle 40 which cooperates with a dial 41 calibrated to indicate the intensity of illumination of the image of the test characters.

The reflector 21 has a central aperture 42 through which light passes from the source to a condenser 43 and an objective 44. A suitable diaphragm 45 is located adjacent the condenser for determining the size and shape of the light beam which is usually coextensive on the screen with the image beam. An adjustable diaphragm 46, which may be identical with the diaphragm 39, is controlled by a handle 47 cooperating with a scale 48 calibrated to indicate the intensity of the beam.

The light source 20, condenser 43 and objective 44 together constitute a light projector which projects light on an area of the screen 38 substantially coextensive with the image of the test characters. This light beam casts a veiling glare on the screen 38 and changes the contrast between the image of the test character and its background.

In practicing the method of the present invention, the test characters are projected on the screen at a certain size and contrast. The intensity of the veiling glare is then varied until the threshold is reached. The control by means of the veiling glare is very sensitive and the increase or decrease of visual acuity with different test lenses can be readily detected. Of course, the veiling glare could be left constant and either the size or illumination of the test characters varied.

From the foregoing it will be apparent that I am able to attain the objects of my invention and provide a new and improved method and apparatus for testing eyes in which the contrast of the test characters can be varied to determine the visual acuity. Various modifications can, of course, be made without departing from the spirit of my invention or the scope of the appended claim.

I claim:

An apparatus for testing vision comprising a projection screen at which the patient is directed to look, a source of light, a reflector positioned on one side of said source, a condenser positioned on the other side of said source, a slide having a test object thereon positioned in front of said condenser, means for directing light from said slide onto said screen, an objective for forming an image of said test object on said screen, said objective comprising two independently adjustable lenses, and means for moving said lenses to change the size of the image without changing its focus on the screen, said reflector having an aperture therethrough, a projection system positioned between said aperture and said screen for receiving light from said source and directing it onto the same area of said screen as said image, means for varying the intensity of the projected light, and means for indicating the intensity of the varied light.

FREDERICK W. JOBE.